Patented May 9, 1939

2,157,797

UNITED STATES PATENT OFFICE 2,157,797

INTERMEDIATES FOR WATER-INSOLUBLE AZO DYESTUFFS

Friedrich Muth, Leverkusen-I. G.-Werk, Germany, assignor to General Aniline Works, Inc., New York, N. Y., a corporation of Delaware No Drawing. Application September 25, 1933, Serial No. 690,950. In Germany October 5, 1932

4 Claims. (Cl. 260—346)

The present invention relates to intermediate products suitable for the manufacture of water-insoluble azodyestuffs, more particularly it relates to compounds of the probable general formula:

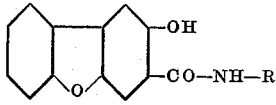

wherein R stands for an aromatic or heterocyclic nucleus which may bear substituents which do not cause solubility in water, such as a benzene, naphthalene, anthracene or carbazole nucleus which may be substituted for example, by alkyl, alkoxy, halogen, the nitro group and the like.

My new compounds are prepared by starting with the corresponding 3-hydroxydiphenyleneoxide-2-carboxylic acid and condensing the same with the corresponding primary aromatic amines according to the known methods of preparing 2.3-hydroxynaphthoic acid arylamides. For example, my new arylamides are obtainable by heating the carboxylic acid chloride or an ester of the carboxylic acid with the corresponding amine in an organic solvent, such as nitrobenzene, and with the addition of an acid-binding or water-binding agent respectively; favorably, the carboxylic acid-chloride is simultaneously prepared in the condensation process by starting with the free acid and dropping in phosphorus oxychloride or phosphorus trichloride.

The starting 3-hydroxydiphenylene-oxide-2-carboxylic acid used in the manufacture of the arylamides is obtainable, for example, according to the process described in my U. S. Patent No. 2,050,958.

The arylamides of the present application may be employed to produce water-insoluble azodyestuffs by diazotizing in the usual manner a primary amine suitable for preparing azodyestuffs free from a group inducing solubility in water and coupling in substance or on a substratum, especially the vegetable fibre, with the arylamides referred to above. The dyestuffs thus obtained generally yield brown to greenish to black shades, those prepared on the fibre according to the usual method of preparing ice colors being distinguished by good fastness properties.

The invention is illustrated by the following examples, without being limited thereto:

*Example 1.*—19.2 grams of 3-hydroxydiphenyleneoxide-2-carboxylic acid and 15.5 grams of 1-amino-2-methoxy-4-chlorobenzene are dissolved in 500 ccs. of toluene; at 60–65° C. 6 grams of phosphous trichloride are lowly dropped in with stirring. After this, the solution is heated to boiling and kept boiling for about 8 hours while stirring. Then the solution is rendered alkaline by the addition of sodium carbonate, the toluene and excess amine are blown off with steam, and the remainder is filtered off and washed with water. It is then dissolved in a large quantity of water with the addition of aqueous caustic soda lye, and from the yellow colored solution the arylamide of the following formula:

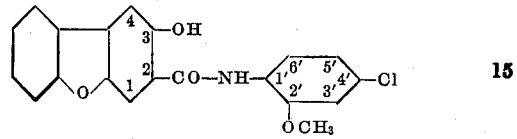

is precipitated by the addition of hydrochloric acid. It crystallizes in yellow colored needles which are arranged to stars of the melting point 255° C.

In an analogous manner the 3-hydroxydiphenyleneoxide-o-carboxylic acid yields with:

| | Degrees C. |
|---|---|
| Aniline, an arylamide of the melting point | 289 |
| 2-toluidine ($CH_3=1$), an arylamide of the melting point | 263 |
| 2-anisidine ($OCH_3=1$), an arylamide of the melting point | 223 |
| 4-anisidine, an arylamide of the melting point | 286 |
| 2-phenetidine, an arylamide of the melting point | 200 |
| 2-chloroaniline, an arylamide of the melting point | 263 |
| 4-chloroaniline, an arylamide of the melting point | 335 |
| 3-nitraniline, an arylamide of the melting point | 297 |
| 1-amino-2.5-dimethylbenzene, an arylamide of the melting point | 214 |
| 1-amino-3.5-dimethylbenzene, an arylamide of the melting point | 241 |
| 1-amino-2-methyl-4-methoxybenzene, an arylamide of the melting point | 243 |
| 1-amino-3-methyl-4-methoxybenzene, an arylamide of the melting point | 253 |
| 1-amino-2-methyl-4-chlorobenzene, an arylamide of the melting point | 299 |
| 1-amino-2-methyl-5-chlorobenzene, an arylamide of the melting point | 250 |
| 1-amino-2.4-dimethoxybenzene, an arylamide of the melting point | 281 |

|   | Degrees C. |
|---|---|
| 1-amino-2.5-dimethoxybenzene, an arylamide of the melting point | 217 |
| 1-amino-2-methoxy-5-chlorobenzene, an arylamide of the melting point | 237 |
| 1-amino-2-sulfodiethylamino-4-chlorobenzene, an arylamide of the melting point | 140 |
| 1-amino-2.4-dimethoxy-5-chlorobenzene, an arylamide of the melting point | 285 |
| 1-amino-2.5-dimethoxy-4-chlorobenzene, an arylamide of the melting point | 285 |
| α-napthylamine, an arylamide of the melting point | 295 |

I claim:

1. Arylamides of the hydroxydiphenylene-oxide-carboxylic acid obtained by causing carbon dioxide to react upon 3-hydroxydiphenylene oxide in the presence of an alkali, wherein the aryl is a member selected from the group consisting of monocyclic and dicyclic aromatic radicles, said arylamides being yellowish, water-soluble substances suitable for producing azodyestuffs.

2. 2′.5′-dimethoxyanilide of the hydroxydiphenylene-oxide-carboxylic acid obtained by causing carbon dioxide to react upon 3-hydroxydiphenylene oxide in the presence of an alkali, said anilide being a yellowish water-insoluble substance of the melting point of 217° C. suitable for producing azodyestuffs.

3. 2′-methoxyanilide of the hydroxydiphenylene-oxide-carboxylic acid obtained by causing carbon dioxide to react upon 3-hydroxydiphenylene oxide in the presence of an alkali, said anilide being a yellowish water-insoluble substance of the melting point of 223° C. suitable for producing azodyestuffs.

4. 2′-methyl-4-methoxyanilide of the hydroxydiphenylene-oxide-carboxylic acid obtained by causing carbon dioxide to react upon 3-hydroxydiphenylene oxide in the presence of an alkali, said anilide being a yellowish water-insoluble substance of the melting point of 243° C. suitable for producing azodyestuffs.

FRIEDRICH MUTH.